(12) United States Patent
Matsui (10) Patent No.: US 8,495,563 B2
(45) Date of Patent: Jul. 23, 2013

(54) CONNECTION INFORMATION GENERATION METHOD AND INFORMATION PROCESSING APPARATUS

(75) Inventor: Yuma Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 12/795,943

(22) Filed: Jun. 8, 2010

(65) Prior Publication Data

US 2010/0325610 A1    Dec. 23, 2010

(30) Foreign Application Priority Data

Jun. 23, 2009  (JP) .................................. 2009-149180

(51) Int. Cl.
*G06F 9/44* (2006.01)
(52) U.S. Cl.
USPC ........... 717/105; 717/100; 717/109; 717/113; 717/125
(58) Field of Classification Search
None
See application file for complete search history.

(56) References Cited

U.S. PATENT DOCUMENTS

| | | | |
|---|---|---|---|
| 6,189,138 B1 | 2/2001 | Fowlow et al. | 717/107 |
| 7,334,216 B2 * | 2/2008 | Molina-Moreno et al. | 717/109 |
| 7,398,512 B2 * | 7/2008 | Martin et al. | 717/105 |
| 7,685,570 B2 * | 3/2010 | Draine et al. | 717/125 |
| 8,296,726 B2 | 10/2012 | Hoff | 717/105 |
| 8,375,353 B2 * | 2/2013 | Alexander et al. | 717/105 |
| 2005/0076327 A1 * | 4/2005 | Helal et al. | 717/100 |
| 2005/0188331 A1 * | 8/2005 | Shimada et al. | 715/816 |
| 2005/0216888 A1 * | 9/2005 | Drummond et al. | 717/113 |
| 2007/0245300 A1 * | 10/2007 | Chan et al. | 717/105 |
| 2008/0028283 A1 | 1/2008 | Iwasaki | 715/200 |
| 2008/0109785 A1 * | 5/2008 | Bailey | 717/109 |
| 2010/0070468 A1 | 3/2010 | Matsui | 707/609 |

OTHER PUBLICATIONS

Schroeder et al., Making a completely icon-based menu in mobile devices to become true: a user-centered design approach for its development, Sep. 2008, 10 pages, <http://delivery.acm.org/10.1145/1410000/1409256/p137-schroeder.pdf.*
Wang et al., A survey of icon taxonomy used in the interface design, Aug. 2007, 4 pages, <http://delivery.acm.org/10.1145/1370000/1362591/p203-wang.pdf>.*
L. Koon, A case study of icon-scenario based animated menu's concept development, Sep. 2006, 4 pages, <http://delivery.acm.org/10.1145/1160000/1152252/p177-koon.pdf>.*

* cited by examiner

*Primary Examiner* — Thuy Dao
(74) *Attorney, Agent, or Firm* — Fitzpatrick, Cella, Harper & Scinto (57) ABSTRACT

The apparatus determines at least one type of component program connectable to a first component program associated with a first icon based on definition information defining a type of each component program and a type of component program connectable to each component program. It displays second icons corresponding to the at least one type of component program and selects one of the second icons in response to a user designation. It displays identifiers of component programs of the type corresponding to the selected second icon, as candidates to be connected to the first component program. It selects one of the identifiers in response to a user designation and sets a component program corresponding to the selected identifier as a second component program associated with the selected second icon. Finally, it generates a program by connecting the first component program and the second component program.

6 Claims, 6 Drawing Sheets

```
<componentType>
    <service name="aService">                        ⎫
        <interface interface="com.cano.AService"/>   ⎬ 301
    </service>                                       ⎭
    <reference name="bService">                      ⎫
        <interface interface="com.cano.BService"/>   |
    </reference>                                     ⎬ 302
    <reference name="cService">                      |
        <interface interface="com.cano.CService"/>   |
    </reference>                                     ⎭
    <property name="parameter"/>
</componentType>                                     } 303
```
202

```xml
<composite name="example">
    <component name="aComponent">
        <implementation class="com.cano.AServiceImpl"/>
        <service name="aService">
            <interface interface="com.cano.AService"/>
        </service>
        <reference name="bService">
            <interface interface="com.cano.BService"/>
        </reference>
        <reference name="cService">
            <interface interface="com.cano.CService"/>
        </reference>
        <property name="parameter"/>xxx</property>
    </component>
    <component name="bComponent">
        <implementation class="com.cano.BServiceImpl1"/>
        <service name="bService">
            <interface interface="com.cano.BService"/>
        </service>
    </component>
    <component name="cComponent">
        <implementation class="com.cano.CServiceImpl3"/>
        <service name="cService">
            <interface interface="com.cano.CService"/>
        </service>
    </component>
    <wire source="aComponent/bService" target="bComponent/bService"/>
    <wire source="aComponent/cService" target="cComponent/cService"/>
</composite>
```

601 — component definitions
602 — wire definitions

CONNECTION INFORMATION GENERATION METHOD AND INFORMATION PROCESSING APPARATUS

BACKGROUND OF THE INVENTION

1. Field of the Invention

The present invention relates to a generation method of connection information indicating connections between component programs, and an information processing apparatus that generates the connection information.

2. Description of the Related Art

Conventionally, a component technique that configures software by combining components as software parts is known. Also, an application constructing technique, which develops an application by selecting and connecting components from a catalog, is known (U.S. Pat. No. 6,189,138).

However, when an application is configured by components using the component technique, if connections between components include any inconsistency, the application often fails to run. In such case, source codes of components have to be checked in advance to detect consistency as programs.

Although the conventional application constructing environment allows the user to visually combine components, it presents all the components to the user, and does not consider any compatibility between components. Therefore, in the related arts, it is difficult to develop an application from components unless the user has any knowledge about components on their source code levels.

SUMMARY OF THE INVENTION

The present invention provides an environment that allows the user to construct a component-based application that runs without causing any inconsistency even when the user does not have any knowledge about source codes of components.

According to the first aspect of the present invention, a connection information generation method executed by an information processing apparatus, which generates connection information indicating a connection between a first component program and another component program based on definition information stored in a storage unit, the method comprising:

determining whether or not the other component program corresponds to a first identifier described in definition information of the first component program associated with a first icon displayed on a display screen;

displaying the first icon, a second icon and a link between the first and second icons on the display screen, wherein the second icon corresponds to the first identifier;

displaying, on the display screen, an identifier of the other component program, which is determined to correspond to the first identifier, as a candidate to be connected to the first component program; and generating the connection information indicating the connection between the first component program and the other component program which is determined to correspond to the first identifier, wherein the determining is executed by a processor of the information processing apparatus.

According to the second aspect of the present invention, an information processing apparatus, which generates connection information indicating a connection between a first component program and another component program based on definition information stored in a storage unit, the apparatus comprising:

a determination unit which determines whether or not the other component program corresponds to a first identifier described in definition information of the first component program associated with a first icon displayed on a display screen;

a display unit which displays the first icon, a second icon and a link between the first and second icons on the display screen, wherein the second icon corresponds to the first identifier, and displays, on the display screen, an identifier of the other component program, which is determined to correspond to the first identifier, as a candidate to be connected to the first component program; and a generation unit which generates the connection information indicating the connection between the first component program and the other component program which is determined to correspond to the first identifier, wherein the determination unit is implemented by a process executed by a processor of the information processing apparatus.

According to the third aspect of the present invention, a storage medium, which stores a computer program executed by a computer to generate connection information indicating a connection between a first component program and another component program based on definition information stored in a storage unit, the computer program making the computer function as:

a determination unit which determines whether or not the other component program corresponds to a first identifier described in definition information of the first component program associated with a first icon displayed on a display screen;

a display unit which displays the first icon, a second icon and a link between the first and second icons on the display screen, wherein the second icon corresponds to the first identifier, and displays, on the display screen, an identifier of the other component program, which is determined to correspond to the first identifier, as a candidate to be connected to the first component program; and a generation unit which generates the connection information indicating the connection between the first component program and the other component program which is determined to correspond to the first identifier.

Further features of the present invention will become apparent from the following description of exemplary embodiments with reference to the attached drawings.

DESCRIPTION OF THE EMBODIMENTS

Embodiments of the present invention will be described hereinafter with reference to the accompanying drawings.

Note that each of the embodiments to be described hereinafter is an example when the present invention is practiced practically, and is one of practical embodiments of the arrangement described in the scope of the claims.

This embodiment will explain a technique that allows even a user, who does not have any knowledge about source codes of component programs created in advance as program parts, to easily combine respective component programs to construct software. An information processing apparatus according to this embodiment will be described first using FIG. 1.

Figure 1:
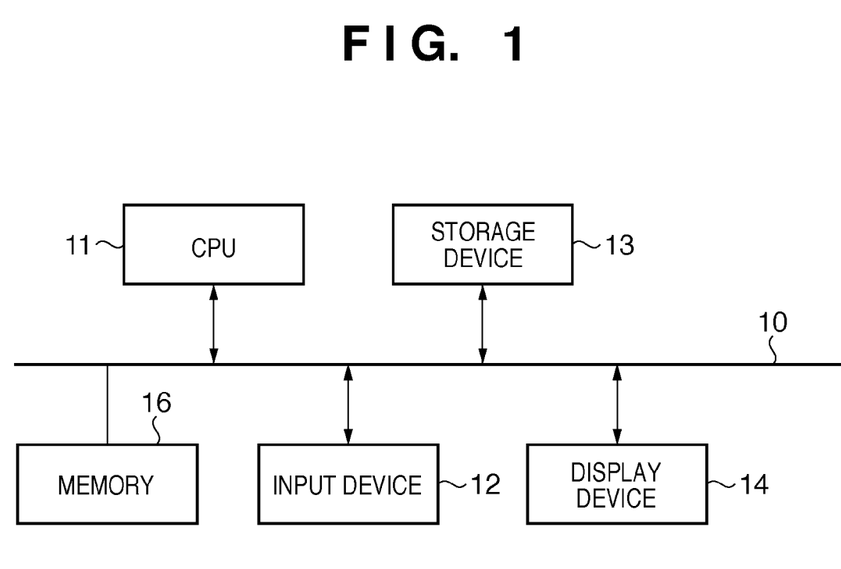
FIG. 1 is a block diagram showing an example of the functional arrangement of an information processing apparatus according to the first embodiment.

A CPU 11 controls the overall information processing apparatus using computer programs and data stored in a memory 16 and executes respective processes to be described later as those which are to be implemented by the information processing apparatus.

The memory 16 has an area for temporarily storing computer programs and data loaded from a storage device 13, and a work area used by the CPU 11 to execute various processes. That is, the memory 16 can provide various areas as needed.

The storage device 13 is a large-capacity information storage device represented by a hard disk drive. The storage device 13 stores (saves) an OS (Operating System), application programs (to be described later), component programs for respective functions, and various data groups (to be described later). Computer programs and data saved in the storage device 13 are loaded onto the memory 16 as needed under the control of the CPU 11, and are to be processed by the CPU 11.

An input device 12 includes a keyboard and mouse. When the user of this apparatus operates the input device 12, he or she can input various instructions to the CPU 11. A display device 14 includes a CRT or liquid crystal panel, and can display the processing results of the CPU 11 using images, characters, and the like. Reference numeral 10 denotes a bus which interconnects the aforementioned units.

Note that this embodiment implements respective processes to be described below using the information processing apparatus having the hardware arrangement example shown in FIG. 1. However, an apparatus having another arrangement may be applied to this embodiment as long as it can implement the same processes.

A software environment for constructing a piece of software by selected component programs, which are selected by the user from a plurality of kinds of component programs will be described below using FIG. 2A.

An application constructing environment 201 is application software used to construct software by component programs selected by the user from a plurality of kinds of component programs, and is configured by computer programs. The application constructing environment 201 executes processing to have, as an input, component definition information 202 created in advance for each component program. Then, the application constructing environment 201 outputs component connection setting information 203 as an acceptance result of component program selection operations by the user.

Figure 3:
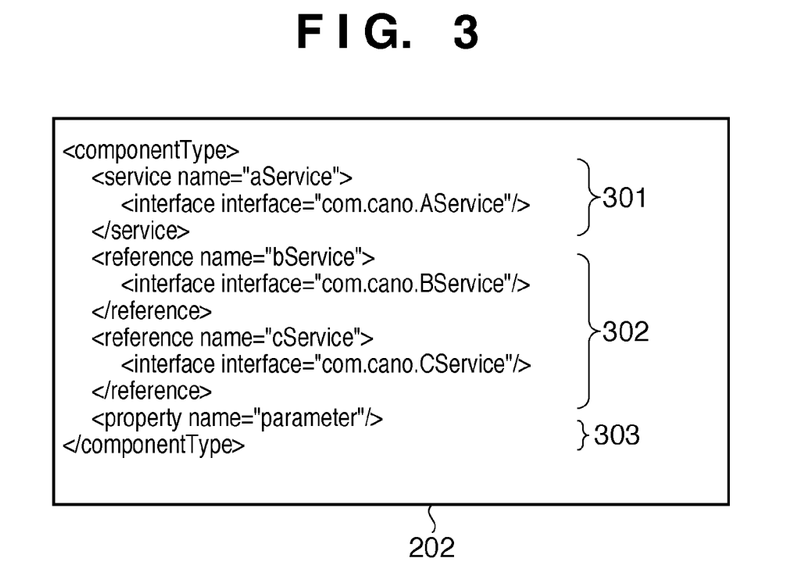
FIG. 3 is a view showing an example of component definition information 202.

An example of the component definition information 202 will be described below with reference to FIG. 3. As shown in FIG. 3, the component definition information 202 is configured by a set of a service definition description field 301, reference definition description field 302, and attribute definition description field 303.

The service definition description field 301 describes function information, which indicates a function (service) of a component program corresponding to the component definition information 202, and a group to which this function belongs. More specifically, the service definition description field 301 describes information which defines an interface of the component program. A "type" is defined for the function of the component program, and the "type" is prepared by assigning a unique identifier to an API group described in a programming language or interface description language. Therefore, the "group to which the function belongs" is the "type of the function". Whether or not types have compatibility between them is decided depending on whether or not they are the same type or are commutative.

The commutativity of types will be further described below. An object-oriented programming language such as Java allows a high-order type in type hierarchies to substitute a low-order type. For example, "ConcreteService" as a derivative class of a type "AbstractService" can be handled as "AbstractService" as a base class. However, their reverse substitution is impossible.

Also, the commutativity of types which do not have an identical type hierarchy (for example, different languages) is checked based on matching between APIs. For example, the commutativity between a service type described in Java and that described in WSDL is examined as follows. When the service type of WSDL includes APIs having the same names, arguments, and return values as those of APIs included in the service type of Java, the service type of Java can be substituted by that of WSDL.

The reference definition description field 302 describes group information indicating a group to which a function compatible with the component program corresponding to the component definition information 202 belongs. The group information indicates a type of function compatible with the component program corresponding to the component definition information 202. The reference definition description field 302 of the component definition information 202 describes types of functions required by the component program having that component definition information 202.

The attribute definition description field 303 describes information which defines a property of the component program corresponding to the component definition information 202, and this information is editable. Of course, other description fields may be configured to be editable.

Pieces of such component definition information 202 for respective component programs are saved in the storage device 13. These pieces of information are read out onto the memory 16 under the control of the CPU 11 as needed.

A GUI (Graphical User Interface) used to combine component programs using pieces of component definition information 202 will be described below with reference to FIG. 4. Note that such GUI runs by executing the computer program of the application constructing environment 201.

The user creates a piece of software by connecting component programs using this GUI. This GUI allows even a user who does not have any knowledge about source codes of component programs to connect component programs. For this purpose, this GUI displays respective component programs as icons, and the user decides a connection order of these icons, thus saving a connection state of icons as that of component programs intact. Thus, the user can connect component programs by simple operations, that is, by connecting icons. An operation method of this GUI will be described below.

In an area 501, icons corresponding to component programs to be used are displayed. When the user lays out an icon in the area 501, he or she inputs an icon layout instruction using the input device 12. An operation method required to lay out icons is not particularly limited. Upon reception of this layout instruction, the CPU 11 displays an icon 502 in the area 501. In this state, the icon 502 is not associated with any component program. Note that FIG. 4 illustrates a rectangular icon, but the shape and display form of an icon are not particularly limited.

Next, the user sets which component program this icon 502 indicates. That is, the user selects one component program indicated by the icon 502 from respective component programs saved in the storage device 13. For example, the CPU 11 reads out pieces of identification information (file names, function names, etc.) of all component programs saved in the storage device 13, and displays the respective pieces of readout identification information in an area 504 on a display screen of the display device 14. Of course, pieces of information to be displayed as a list are not limited to those, and a list of pieces of identification information (for example, file names) of all pieces of component definition information 202 may be displayed.

Then, when the user designates a piece of identification information using the input device 12 (to issue a selection instruction), the CPU 11 reads out component definition information 202 of a component program corresponding to the designated identification information from the storage device 13. The CPU 11 sets the readout component definition information 202 for the icon 502. With the series of operations and processes, the CPU 11 sets the component definition information 202 of one component program for the icon 502.

The CPU 11 refers to a reference definition description field 302 in the component definition information 202 set for the icon 502 to specify types of functions compatible with the component program corresponding to the component definition information 202. The CPU 11 displays icons corresponding to the specified types in the area 501 to be juxtaposed with the icon 502. When the component definition information 202 has the configuration exemplified in FIG. 3, types of functions compatible with the component program corresponding to that component definition information 202 include two types "com.cano.BService" and "com.cano.CService". Therefore, the CPU 11 displays icons 503 and 550 corresponding to these two types in the area 501, as shown in FIG. 4. In the following description, assume that the icon 503 is an icon corresponding to "com.cano.BService" and the icon 550 is an icon corresponding to "com.cano.CService".

Note that the CPU 11 displays connection lines between the icons 502 and 503 and between the icons 502 and 550. This connection line may use any of display forms such as a solid line, dotted line, arrow, and flickering as long as it can explicitly express a link between icons.

The user sets which component program the icon 503 indicates using the input device 12. Since the same applies to a setting operation for the icon 550, the setting operation for the icon 503 will be described in this case.

When the user designates the icon 503 using the input device 12, the CPU 11 searches the storage device 13 for component definition information 202 including a service definition description field 301 indicating a function which belongs to the type "com.cano.BService". In addition, the CPU 11 searches the storage device 13 for component definition information 202 including a service definition description field 301 indicating a function which belongs to a type commutative with the type "com.cano.BService".

That is, the CPU 11 searches for pieces of component definition information 202 (the service definition description field 301) of component programs having functions which belong to the types of functions compatible with the component program corresponding to the component definition information 202 (the reference definition description field 302) set for the icon 502. This component definition information 202 is searched from the storage device 13. As a result of search, the CPU 11 displays, as a list, pieces of identification information of component programs which belong to the type described in the reference definition description field 302 of the component program set for the icon 502 or a type commutative with this type, in the area 504 on the display screen of the display device 14 as set information.

Figure 4:
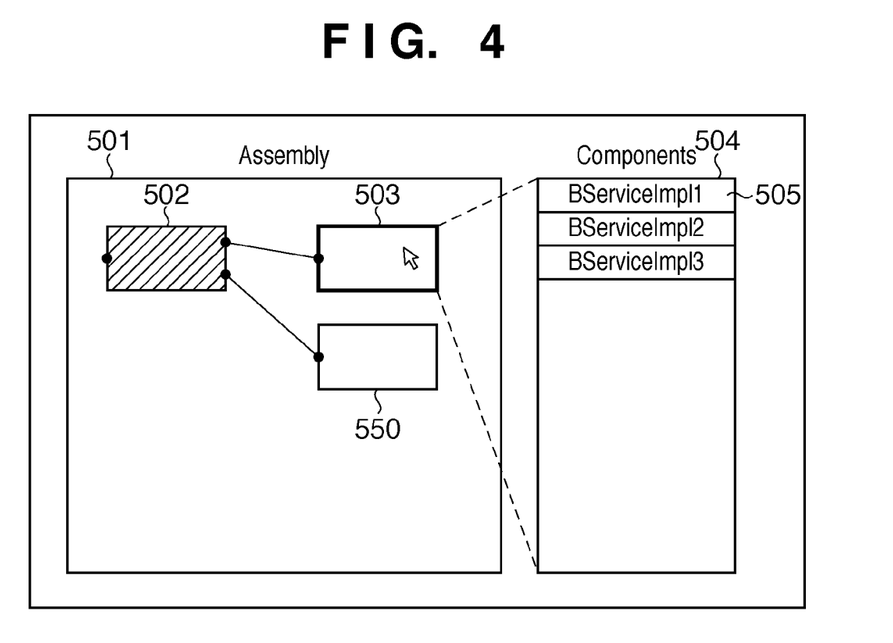
FIG. 4 is a view showing a display example of a GUI.

In FIG. 4, reference numeral 504 denotes an area for making a list display. In this area 504, pieces of identification information 505 of component programs having corresponding pieces of component definition information 202 including service definition description fields 301 indicating functions, which belong to the type "com.cano.BService" or a type commutative with this type, are displayed.

When the user designates a piece of identification information in the area 504 using the input device 12, the CPU 11 sets component definition information 202 of a component program having the designated identification information for this icon 503.

With the aforementioned processing, when component definition information 202 is set for the icon 502 which is laid out first, the subsequent icons 503 and 550 which follow this icon are automatically laid out (display control). In addition, pieces of identification information of component programs that belong to types, which can be set for these subsequent icons 503 and 550, can be presented to the user. In this way, by only selecting one of the presented component programs, the user can select a component program connected to that corresponding to the icon 502 which is laid out first.

When the aforementioned processing is repeated until component definition information 202 including a reference definition description field 302 which does not describe any type is set for an icon, an application can be assembled by connecting component programs while maintaining consistency.

The pieces of component definition information 202 set for the respective icons are connected in a connection order of icons. Then, the connection result is output to the storage device 13 as component connection setting information 203 serving as setting information required to connect component programs corresponding to respective pieces of component definition information 202. Of course, the output destination of the component connection setting information 203 is not limited to this, and it may be displayed on the display screen of the display device 14 or may be output to another apparatus on a network.

Figure 5:
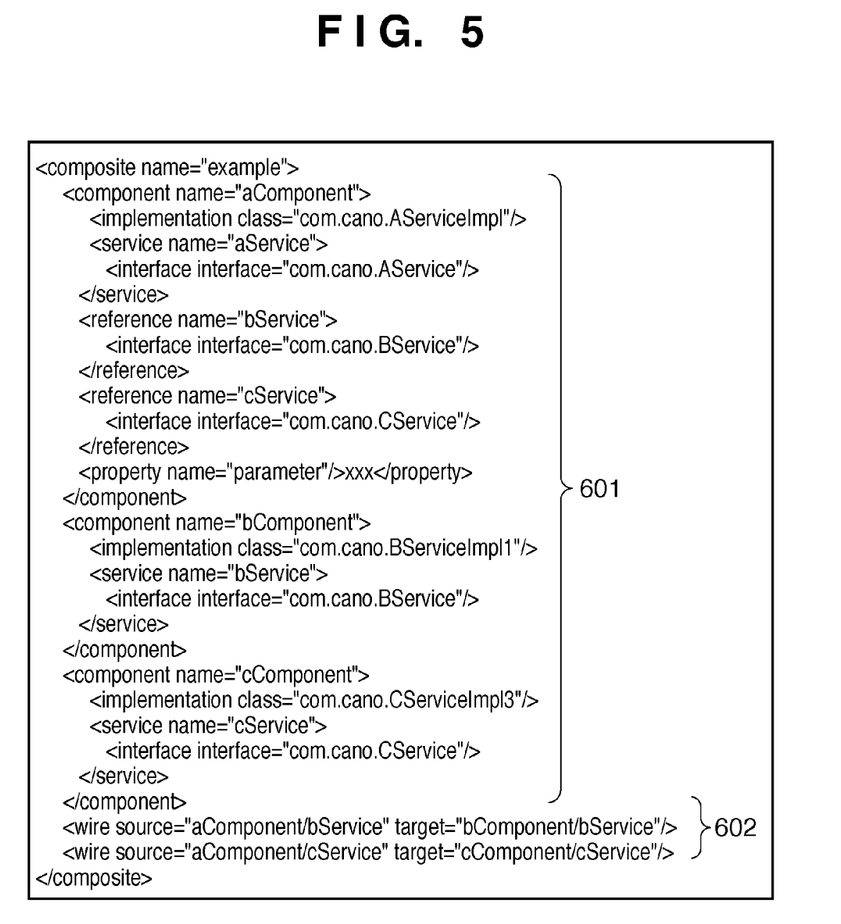
FIG. 5 is a view showing an example of component connection setting information 203.

An example of the component connection setting information 203 will be described below with reference to FIG. 5. A description field 601 describes a connection result of pieces of component definition information 202 set for respective icons in the connection order of icons. A description field 602 describes pieces of identification information of a component program as a connection source and that as a connection destination.

Then, application software is generated by connecting corresponding component programs based on this component connection setting information 203, and the generated application software is executed.

Note that in addition to the aforementioned processing, a screen used to edit property information described in each of attribute definition description fields 303 in pieces of component definition information 202 of connected component programs may be independently displayed on the display screen of the display device 14.

Figure 6:
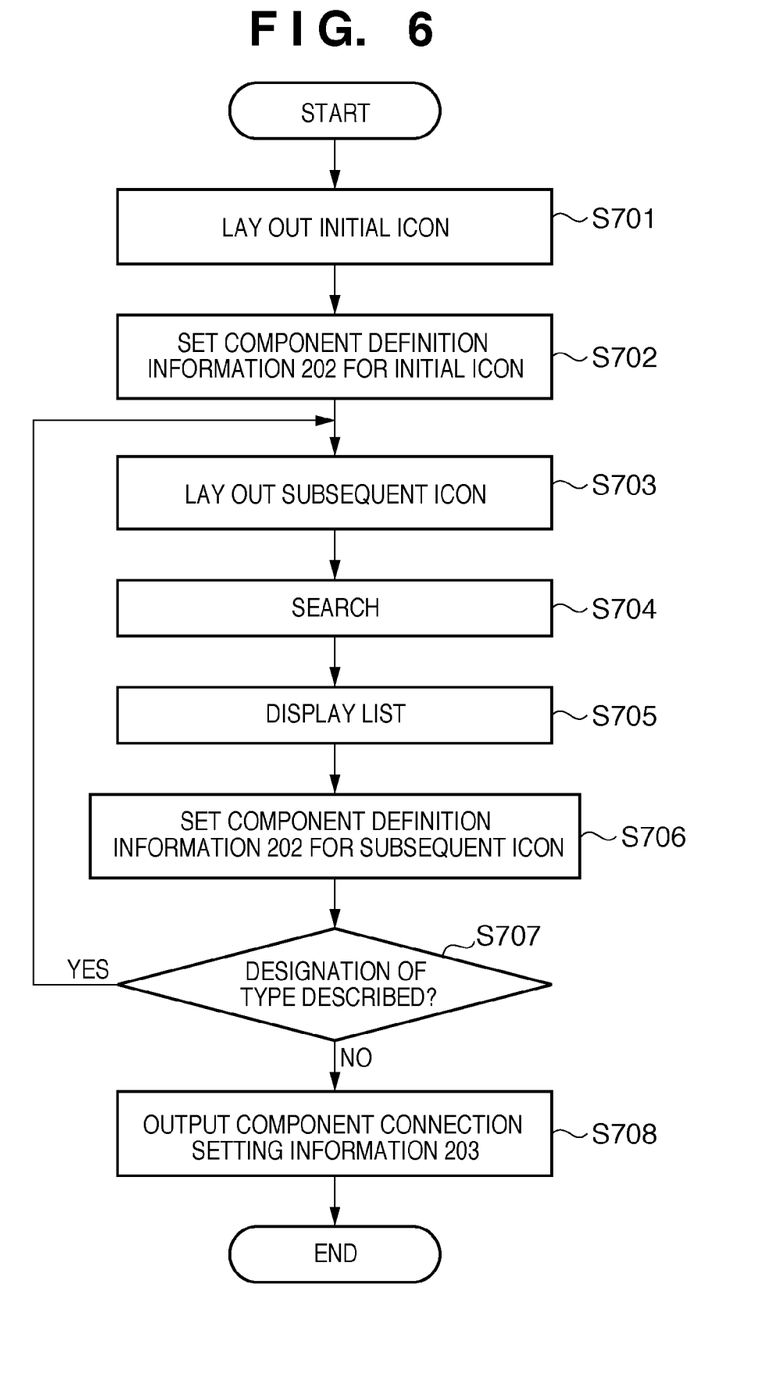
FIG. 6 is a flowchart of processing executed to generate the component connection setting information 203.

Processing executed by the information processing apparatus according to this embodiment to generate the component connection setting information 203 by connecting component programs using the GUI will be described below with reference to FIG. 6 which shows the flowchart of that processing. Note that computer programs and data for making the CPU 11 execute the processing according to the flowchart of FIG. 6 are saved in the storage device 13. These computer programs are included in those of the application constructing environment 201.

The CPU 11 reads out these computer programs and data onto the memory 16 and executes processes using these readout computer programs and data. Then, the information processing apparatus according to this embodiment executes processes in respective steps to be described below.

When the user inputs an instruction to lay out a first icon in the area 501 using the input device 12, the CPU 11 lays out one icon 502 as an initial icon in the area 501 based on this instruction in step S701.

Next, when the user inputs an instruction to set a component program indicated by the initial icon 502, the CPU 11 displays pieces of identification information of all component programs saved in the storage device 13 in the area 504 on the display screen of the display device 14 in step S702. When the user designates a piece of identification information using the input device 12, the CPU 11 sets component definition information 202 of a component program corresponding to the designated identification information for the initial icon 502.

In step S703, the CPU 11 displays the subsequent icons 503 and 550 in the area 501 to be juxtaposed with the initial icon 502. These subsequent icons 503 and 550 are icons which correspond to types of functions compatible with the component program corresponding to a service definition description field 301 in the component definition information 202 set for the initial icon 502. When the component definition information 202 of the component program set for the initial icon 502 has the contents shown in FIG. 3, since its reference definition description field 302 describes two types, the two subsequent icons 503 and 550 are displayed in the area 501. The following description will be given taking the icon 503 as an example of the subsequent icon. However, even when the subsequent icon is another icon, the following description remains the same. Of the two types described in the reference definition description field 302 in the component definition information 202 of the component program set for the initial icon 502, a type "com.cano.BService" corresponds to the icon 503.

When the user designates the icon 503 using the input device 12, the CPU 11 executes the following process in step S704. That is, the CPU 11 searches the storage device 13 for pieces of component definition information 202 including service definition description fields 301, which indicate functions that belong to the type "com.cano.BService" or those which are commutative with this type. In this case, the CPU 11 searches for component programs corresponding to service definition description fields 301, which describe "com.cano.BService", of pieces of component definition information 202 first. Also, the CPU 11 searches for component programs having types commutative with "com.cano.BService". A method of checking whether or not a component type is commutative has been described above.

In step S705, the CPU 11 displays, as a list, pieces of identification information of component programs corresponding to pieces of component definition information 202 which hit the search conditions in the area 504.

When the user designates a piece of identification information in the area 504 using the input device 12, the CPU 11 sets component definition information 202 of a component program having the designated identification information for the icon 503 in step S706.

The CPU 11 determines in step S707 with reference to a reference definition description field 302 in the component definition information 202 set for the icon 503 whether or not the reference definition description field 302 describes a type. As a result of this determination process, if the reference definition description field 302 describes a type, the process returns to step S703, and the CPU 11 lays out subsequent icons which follow the icon 503, and executes processes in step S704 and subsequent steps. If the reference definition description field 302 of the icon 503 does not describe any type, the CPU 11 determines whether or not a reference definition description field 302 of the icon 502 describes a type. If the reference definition description field 302 of the icon 502 describes a type, the process also returns to step S703. On the other hand, as a result of the determination process in step S707, if the reference definition description fields 302 of the icons 503 and 502 do not describe any type, the process advances to step S708.

In step S708, the CPU 11 connects the pieces of component definition information 202 set for respective icons in the connection order of icons, and outputs them as a piece of component connection setting information 203 to the storage device 13.

As described above, component definition information 202 is set for each icon using the GUI, and a connection result of the pieces of set component definition information 202 in the connection order of icons is generated as a piece of component connection setting information 203.

An embodiment which generates a piece of application software by connecting respective component programs based on this component connection setting information 203 and executes that software will be described below. In this embodiment as well, an information processing apparatus executes respective processes to be described below, and the main body of these processes is a CPU 11 as in the above description.

A software environment required to generate a piece of application software by connecting respective component programs based on the component connection setting information 203 will be described below with reference to FIG. 2B.

Figure 2A:
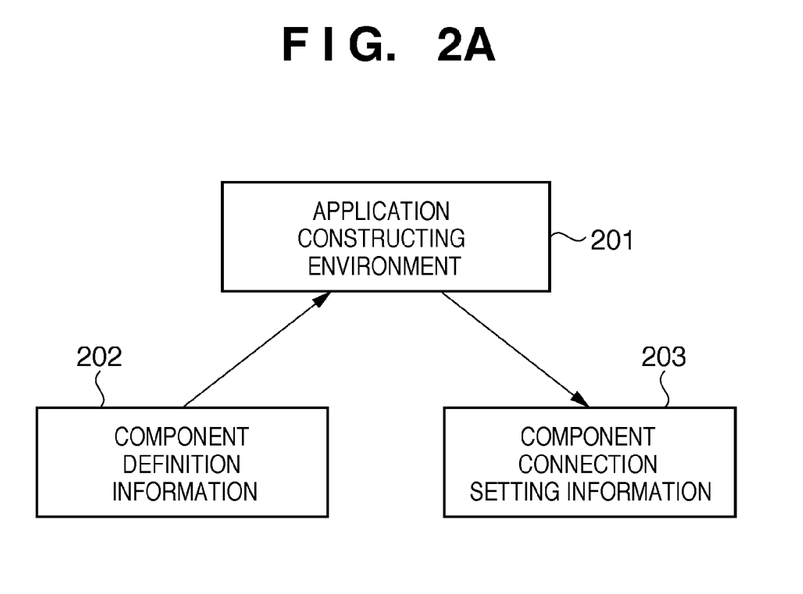
FIGS. 2A and 2B are diagrams showing software environment examples.
Figure 2B:
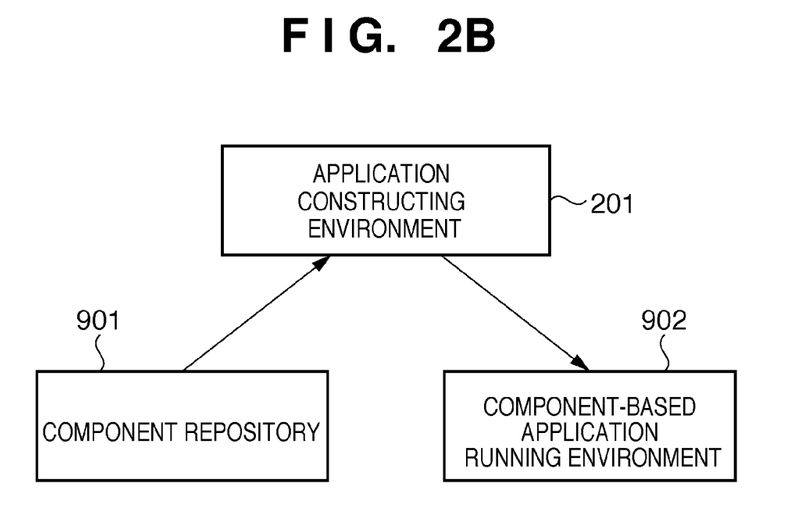

An application constructing environment 201 has the following functions in addition to those shown in FIG. 2A. That is, the application constructing environment 201 inputs a component repository 901 as a component program group saved in a storage device 13. Then, the application constructing environment 201 acquires component programs corresponding to respective pieces of component definition information 202 in the component connection setting information 203 from the component repository 901. The application constructing environment 201 then generates a component-based application including the acquired component program group, component connection setting information 203, and a component connection engine (to be described later). The application constructing environment 201 installs the generated component-based application in a computer program called a component-based application running environment 902, and controls it to run.

Figure 8:
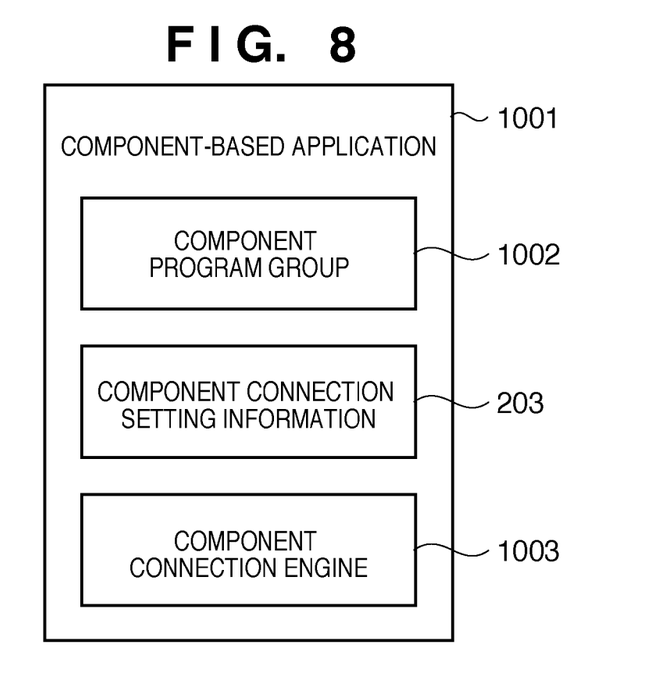
FIG. 8 is a view showing an example of the configuration of a component-based application.

An example of the configuration of the component-based application generated by the application constructing environment 201 will be described below with reference to FIG. 8. A component-based application 1001 includes component connection setting information 203, a component program group 1002 corresponding to a group of pieces of component definition information 202 in the component connection setting information 203, and a component connection engine 1003. Note that when the component connection engine 1003 exists in a running environment outside the application, it need not be included in the application.

When such component-based application 1001 is installed in the component-based application running environment 902, the component connection engine 1003 refers to the component connection setting information 203. The component connection engine 1003 connects the component program group 1002 based on the referred component connection setting information 203. Then, application software generated by the connection is executed.

Figure 7:
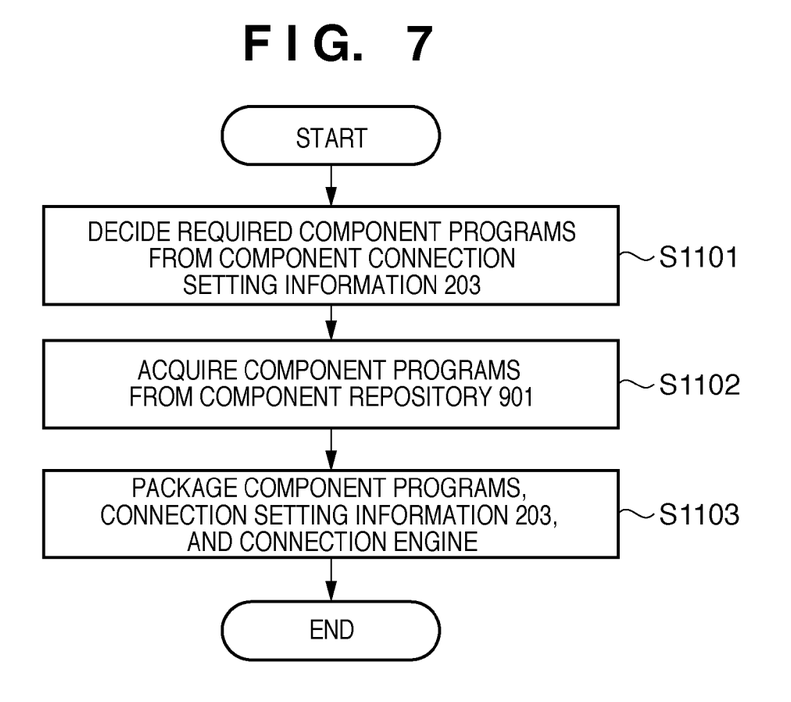
FIG. 7 is a flowchart of processing executed to generate a component-based application.

A series of processes required to generate a component-based application will be described below with reference to FIG. 7. Note that computer programs and data for making the CPU 11 execute the processing according to the flowchart of FIG. 7 are saved in the storage device 13. These computer programs are included in those of the application constructing environment 201.

The CPU 11 reads out these computer programs and data onto the memory 16 and executes processes using these read-out computer programs and data. Then, the information processing apparatus according to this embodiment executes processes in respective steps to be described below.

In step S1101, the CPU 11 specifies component programs corresponding to respective pieces of component definition information 202 in the component connection setting information 203.

In step S1102, the CPU 11 acquires the component program group specified in step S1101 from the component repository 901. Then, the CPU 11 packages the component connection setting information 203, the component program group acquired in step S1102, and the component connection engine to generate a component-based application including them in step S1103.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149180 filed Jun. 23, 2009 which is hereby incorporated by reference herein in its entirety.

What is claimed is:

1. A program generation method executed by an information processing apparatus, the method comprising the steps of:
    determining at least one type of component program connectable to a first component program associated with a first icon displayed on a display screen based on definition information which defines, for available component programs, a type of each component program and a type of component program connectable to each component program;
    displaying second icons which correspond to the at least one type of component program connectable to the first component program on the display screen;
    selecting one of the second icons in response to a designation by a user;
    displaying, on the display screen, identifiers of component programs of the type corresponding to the selected one of the second icons, as candidates to be connected to the first component program;
    selecting one of the identifiers of component programs in response to a designation by the user and setting a component program corresponding to the selected identifier as a second component program associated with the selected second icon; and
    generating a program by connecting the first component program and the second component program,
    wherein the determining is executed by a processor of the information processing apparatus wherein the determining is executed by a processor of the information processing apparatus; and
    wherein, when a second type of component program is commutative with a first type of component program which is defined to be connectable to the first component program in the definition information, it is determined in said determining step that a component program which corresponds to the second type is connectable to the first component program.

2. The method according to claim 1, wherein, in said generating step, the first component program is connected with the second component program in accordance with a connection between the first icon and the selected second icon designated by the user.

3. An information processing apparatus having a processor, comprising:
    a determination unit which determines at least one type of component program connectable to a first component program associated with a first icon displayed on a display screen based on definition information which defines, for available component programs, a type of each component program and a type of component program connectable to each component program;
    a first display unit which displays second icons which correspond to the at least one type of component program connectable to the first component program on the display screen,
    a first selecting unit which selects one of the second icons in response to a designation by a user; and
    a second display unit which displays, on the display screen, identifiers of component programs of the type corresponding to the selected one of the second icons, as candidates to be connected to the first component program;
    a second selecting unit which selects one of the identifiers of component programs in response to a designation by the user and sets a component program corresponding to the selected identifier as a second component program associated with the selected second icon; and
    a generation unit which generates a program by connecting the first component program and the second component program
    a generation unit which generates a program by connecting the first component program and the second component program; and wherein, when a second type of component program is commutative with a first type of component program which is defined to be connectable to the first component program in the definition information, said determination unit determines that the a component program which corresponds to the second type is connectable to the first component program.

4. The apparatus according to claim 3, wherein said generating unit connects the first component program with the second component program in accordance with a connection between the first icon and the selected second icon designated by the user.

5. A non-transitory computer-readable storage medium, storing an executable program for causing a computer to function as:

a determination unit which determines at least one type of component program connectable to a first component program associated with a first icon displayed on a display screen based on definition information which defines, for available component programs, a type of each component program and a type of component program connectable to each component program;

a first display unit which displays second icons which correspond to the at least one type of component program connectable to the first component program on the display screen;

a first selecting unit which selects one of the second icons in response to a designation by a user;

a second display unit which displays, on the display screen, identifiers of component programs of the type corresponding to the selected one of the second icons, as candidates to be connected to the first component program;

a second selecting unit which selects one of the identifiers of component programs in response to a designation by the user and sets a component program corresponding to the selected identifier as a second component program associated with the selected second icon; and a generation unit which generates a program by connecting the first component program and the second component program a generation unit which generates a program by connecting the first component program and the second component program; and wherein, when a second type of component program is commutative with a first type of component program which is defined to be connectable to the first component program in the definition information, said determination unit determines that a component program which corresponds to the second type is connectable to the first component program.

6. The medium according to claim 5 wherein said generating unit connects the first component program with the second component program in accordance with a connection between the first icon and the selected second icon designated by the user.

* * * * *